United States Patent
Wang et al.

(10) Patent No.: US 10,243,634 B2
(45) Date of Patent: Mar. 26, 2019

(54) METHOD AND DEVICE FOR DUAL LAYER BEAMFORMING

(71) Applicant: DATANG MOBILE COMMUNICATIONS EQUIPMENT CO., LTD., Beijing (CN)

(72) Inventors: Xi Wang, Beijing (CN); Xiaojuan Zhang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 15/116,449

(22) PCT Filed: Feb. 9, 2015

(86) PCT No.: PCT/CN2015/072579
§ 371 (c)(1),
(2) Date: Aug. 3, 2016

(87) PCT Pub. No.: WO2015/124071
PCT Pub. Date: Aug. 27, 2015

(65) Prior Publication Data
US 2017/0019161 A1    Jan. 19, 2017

(30) Foreign Application Priority Data
Feb. 19, 2014  (CN) .......................... 2014 1 0056708

(51) Int. Cl.
*H04B 7/06*  (2006.01)
*H04B 7/10*  (2017.01)

(52) U.S. Cl.
CPC .......... *H04B 7/0617* (2013.01); *H04B 7/066* (2013.01); *H04B 7/0619* (2013.01); *H04B 7/10* (2013.01)

(58) Field of Classification Search
CPC .......................... H04W 72/0486; H04B 7/0626
(Continued)

(56) References Cited

U.S. PATENT DOCUMENTS

2012/0269146 A1* 10/2012 Pajukoski .............. H04B 7/024
                                                                    370/329
2013/0257655 A1   10/2013 Hu et al.
(Continued)

FOREIGN PATENT DOCUMENTS

CN        103283159 A      9/2013
CN        103326765 A      9/2013
(Continued)

OTHER PUBLICATIONS

May 19, 2015 International Search Report issued in International Patent Application No. PCT/CN2015/072579.
(Continued)

*Primary Examiner* — Iqbal Zaidi
(74) *Attorney, Agent, or Firm* — Oliff PLC

(57) ABSTRACT

A method and device for dual layer beamforming are disclosed to solve the problems of bad beam directivity and poor beamforming effect in current methods for beamforming wherein the method comprises: receiving sounding reference signal (SRS) sent by the terminal wherein the broadband occupied when sending the SRS is divided into a plurality of sub-bands by the terminal; determining the broadband beamforming vector corresponding to the broadband and the sub-band beamforming vector corresponding to each sub-band respectively according to the SRS; determining two polarized-direction beamforming vectors corresponding to each sub-band respectively according to the broadband beamforming vector corresponding to the broadband or the sub-band beamforming vector corresponding to each sub-band; and directed to each sub-band, adopting the
(Continued)

two polarized-direction beamforming vectors corresponding to the sub-band for dual layer beamforming. The method for dual layer beamforming of the present application has stronger beam directivity and better beamforming effect.

27 Claims, 3 Drawing Sheets

(58) Field of Classification Search
USPC .......................... 370/328–339; 455/69, 101
See application file for complete search history.

(56) References Cited

U.S. PATENT DOCUMENTS

| | | | |
|---|---|---|---|
| 2013/0272263 A1* | 10/2013 | Pi | H04W 72/042 370/330 |
| 2015/0049826 A1 | 2/2015 | Liu et al. | |
| 2015/0381328 A1* | 12/2015 | Mo | H04B 7/024 370/329 |

FOREIGN PATENT DOCUMENTS

| | | |
|---|---|---|
| CN | 103905105 A | 7/2014 |
| WO | 2012/068716 A1 | 5/2012 |

OTHER PUBLICATIONS

Aug. 23, 2016 International Preliminary Report on Patentability issued in International Patent Application No. PCT/CN2015/072579.

\* cited by examiner

METHOD AND DEVICE FOR DUAL LAYER BEAMFORMING

FIELD OF TECHNOLOGY

The present application relates to the technical field of communication, in particular to a method and device for dual layer beamforming.

BACKGROUND

Beamforming is a multi-antenna transmission technology used in antenna array with small intervals and the main principle thereof is to utilize the strong relativity of the array signals and the interfering principle of the waves to produce the radiation pattern with strong directivity, making the main lobe of the radiation pattern self-adaptively point to the DOA (direction of arrival) of the user terminal, such that the signal to noise ratio, the system capacity and the coverage area are improved. Dual layer beamforming technology is applied under the condition of relatively sufficient signal scatterers and is the combination of technologies of smart antenna beamforming and MIMO (Multiple-Input Multiple-Output) spatial multiplexing. In TD-LTE (Time Division-Long Term Evolution) system, the channel symmetry of the upper and bottom rows of TDD (Time Division Duplexing) may be utilized to simultaneously transmit two sets of beamforming data flows, thereby realizing the spatial multiplexing, namely, beamforming.

Current methods for beamforming are mainly EBB (Eigenvalue Based Beamforming) and GOB (Grid Of Beam) methods.

EBB is a method for self-adaptively updating the beam and capable of soundly matching with the channel changes and its process is: the base station utilizes SRS (Sounding Reference Signal) sent by the terminal antenna to even the channel covariance matrix corresponding to a plurality of PRBs (physical resource block) and then decompose the characteristic value to obtain beamforming vectors of two data flows.

However, in the current TD-LTE system, the commercial terminal does not support sending SRS by turns. Therefore, when unable to acquire the signals of 2*I channels (I being the antenna number of the base station) and calculate the beamforming vector by using EBB method to decompose the characteristic value, the base station can only utilize the signals of 1*I channels, thereby resulting in small signal power and bad beam directivity corresponding to the second beamforming vector and making the effect of dual layer beamforming poor.

Directed to the above problems existing in EBB method and considering that currently, the smart antenna adopted at the base station is dual polarized antenna at the same time, polarization diversity may be utilized to obtain the effect of dual layer beamforming and hereby, GOB method is proposed. The process of GOB method is: estimating the DOA (Direction Of Arrival) angle of the terminal firstly, then acquiring a set of GOB beamforming vectors of 1*I (I being the antenna number of the base station) from the pre-configured array vectors according to the DOA angle and finally acquiring two polarized-direction beamforming vectors respectively used for the two data flows.

Compared with EBB method, GOB method has a greater improvement in performance. However, GOB method divides the whole space into L regions, setting an initial angle for each region and the beam shape within each region is fixed. Therefore, GOB method is applicable to LOS (Line-of-sight) channel with a straight ray path. However, for NLOS (Non-Line-of-Sight) channel, the beam acquired by GOB method cannot match with the characteristics of the channel well, thereby resulting in a poor beamforming effect for the NLOS channel.

SUMMARY

The present application provides a method and device for dual layer beamforming to solve the problems of bad beam directivity and poor beamforming effect in current methods for beamforming.

To solve the above problems, the present application discloses a method for dual layer beamforming, comprising:

receiving sounding reference signal (SRS) sent by the terminal wherein the broadband occupied when sending the SRS is divided into a plurality of sub-bands by the terminal;

determining the broadband beamforming vector corresponding to the broadband and the sub-band beamforming vector corresponding to each sub-band respectively according to the SRS;

determining two polarized-direction beamforming vectors corresponding to each sub-band respectively according to the broadband beamforming vector corresponding to the broadband or the sub-band beamforming vector corresponding to each sub-band;

and directed to each sub-band, adopting the two polarized-direction beamforming vectors corresponding to the sub-band for dual layer beamforming.

Preferably, the step of determining the broadband beamforming vector corresponding to the broadband and the sub-band beamforming vector corresponding to each sub-band respectively according to the SRS comprises:

determining the channel covariance matrix $\overline{R}$ of the broadband and the channel covariance matrix $\overline{R_n}$ of the $n^{th}$ sub-band according to the SRS wherein n=1, 2 . . . , Ng and Ng represents the total number of the sub-bands;

determining the initial broadband beamforming vector $w_1$ corresponding to the broadband according to the channel covariance matrix of the broadband and the initial sub-band beamforming vector $w_{n1}$ corresponding to the $n^{th}$ sub-band according to the channel covariance matrix of the $n^{th}$ sub-band;

taking phase operation for the initial broadband beamforming vector corresponding to the broadband to determine the broadband beamforming vector $w$ corresponding to the broadband and taking phase operation for the initial sub-band beamforming vector corresponding to the $n^{th}$ sub-band to determine the sub-band beamforming vector $w_n$ corresponding to the $n^{th}$ sub-band.

Preferably, when sending the SRS, the terminal occupies K sub-carriers and each sub-band comprises $N_{sc}$ sub-carriers wherein $N_{sc}<K$;

And the step of determining the channel covariance matrix $\overline{R}$ of the broadband and the channel covariance matrix $\overline{R_n}$ of the $n^{th}$ sub-band according to the SRS comprises:

utilizing the SRS to estimate the frequency domain channel and obtaining the channel estimation matrix of each sub-carrier wherein the channel estimation matrix of the $k^{th}$ sub-carrier is $H_k$:

$$H_k = [h_k^1\ h_k^2\ \ldots\ h_k^I]$$

calculating the channel covariance matrix of each sub-carrier wherein the channel covariance matrix of the $k^{th}$ sub-carrier is $R_k$:

$$R_k = H_k^H H_k$$

calculating the channel covariance matrix $\overline{R_n}$ of the $n^{th}$ sub-band according to the channel covariance matrix of the sub-carrier included in the $n^{th}$ sub-band.

$$\overline{R}_n = \frac{1}{N_{sc}^n} \sum_{k=N'+1}^{N'+N_{sc}^n} R_k$$

calculating the channel covariance matrix $\overline{R}$ of the broadband according to the channel covariance matrix of each sub-band:

$$\overline{R} = \frac{1}{Ng} \sum_{n=1}^{Ng} \overline{R}_n$$

Wherein k=1, 2, . . . , K; I represents the antenna number of the base station, $N_{sc}^n$ represents the number of sub-carriers included in the $n^{th}$ sub-band, N' represents the total number of sub-carriers included in the former n−1 sub-bands and $H_k^H$ represents the transposed-conjugate matrix of $H_k$.

Preferably, the step of determining the initial broadband beamforming vector $w_1$ corresponding to the broadband according to the channel covariance matrix of the broadband comprises:

setting the iterative times M and the initial iterative value $x^1=A^T$ wherein A is the matrix of row 1 and column I, all elements in A are 1, $A^T$ represents the transposed matrix of A and I represents the antenna number of the base station; and setting the initial value of m as 1;

calculating the intermediate parameter $y^{m+1}$ corresponding to the broadband: $y^{m+1}=\overline{R}*x^m$;

finding the most significant bit for the real part and the imaginary part of each element in the intermediate parameter $y^{m+1}$ corresponding to the broadband and intercepting 15 bits downward from the most significant bit of each element in the intermediate parameter $y^{m+1}$ corresponding to the broadband to obtain $x^{m+1}$;

judging whether m satisfies m≥M;

letting m=m+1 and returning to the step of calculating the intermediate parameter $y^{m+1}$ corresponding to the broadband if it is negative;

determining the $x^{m+1}$ as the initial broadband beamforming vector $w_1$ corresponding to the broadband if it is positive.

Preferably, the step of taking phase operation for the initial broadband beamforming vector corresponding to the broadband to determine the broadband beamforming vector corresponding to the broadband comprises:

calculating the broadband beamforming vector w corresponding to the broadband according to following formula:

$$w=x^{m+1}/\|x^{m+1}\|$$

Wherein $\|x^{m+1}\|$ represents the absolute value of each element in $x^{m+1}$.

Preferably, the step of determining the initial sub-band beamforming vector $w_{n1}$ corresponding to the $n^{th}$ sub-band according to the channel covariance matrix of the $n^{th}$ sub-band comprises:

setting the iterative times M and the initial iterative value $x^1=A^T$ wherein A is the matrix of row 1 and column I, all elements in A are 1, $A^T$ represents the transposed matrix of A and I represents the antenna number of the base station; and setting the initial value of m as 1;

calculating the intermediate parameter $y_n^{m+1}$ corresponding to the $n^{th}$sub-band: $y_n^{m+1}=\overline{R_n}*x_n^m$;

finding the most significant bit for the real part and the imaginary part of each element in the intermediate parameter $y_n^{m+1}$ corresponding to the $n^{th}$sub-band and intercepting 15 bits downward from the most significant bit of each element in the intermediate parameter $y_n^{m+1}$ corresponding to the $n^{th}$sub-band to obtain $x_n^{m+1}$;

judging whether m satisfies m≥M;

letting m=m+1 and returning to the step of calculating the intermediate parameter $y_n^{m+1}$ corresponding to the $n^{th}$ sub-band if it is negative;

determining the $x_n^{m+1}$ as the initial sub-band beamforming vector $w_{n1}$ corresponding to the $n^{th}$ sub-band if it is positive.

Preferably, the step of taking phase operation for the initial sub-band beamforming vector corresponding to the $n^{th}$ sub-band to determine the sub-band beamforming vector $w_n$ corresponding to the $n^{th}$ sub-band comprises:

calculating the sub-band beamforming vector $w_n$ corresponding to the $n^{th}$sub-band according to following formula:

$$w_n=x_n^{m+1}/\|x_n^{m+1}\|$$

Wherein $\|x_n^{m+1}\|$ represents the absolute value of each element in $x_n^{m+1}$.

Preferably, the step of determining two polarized-direction beamforming vectors corresponding to each sub-band respectively according to the broadband beamforming vector corresponding to the broadband or the sub-band beamforming vector corresponding to each sub-band comprises;

detecting the change situation of the channel occupied by the terminal when sending the SRS;

directed to each of the sub-bands, adopting the broadband beamforming vector to determine the two polarized-direction beamforming vectors corresponding to the sub-band, if the change of the channel is slow;

directed to each of the sub-bands respectively, adopting the sub-band beamforming vector corresponding to the sub-band to determine the two polarized-direction beamforming vectors corresponding to the sub-band, if the change of the channel is quick.

Preferably, the step of detecting the change situation of the channel occupied by the terminal when sending the SRS comprises;

acquiring the data of channel quality indicator (CQI) corresponding to each of the sub-bands;

calculating the difference value between the maximum CQI data and the minimum CQI data thereof;

comparing the difference value with the preset initial threshold;

determining the change of the channel to be slow, if the difference value is less than or equal to the initial threshold;

determining the change of the channel to be quick, if the difference value is greater than the initial threshold.

Preferably, the step of directed to each of the sub-bands, adopting the broadband beamforming vector to determine the two polarized-direction beamforming vectors corresponding to the sub-band comprises:

setting the latter I/2 elements in I elements of the broadband beamforming vector as zero and using the obtained beamforming vector as one of the polarized-direction beamforming vectors corresponding to each sub-band wherein I represents the antenna number of the base station;

setting the former I/2 elements in I elements of the broadband beamforming vector as zero and using the obtained beamforming vector as the other beamforming polarized-direction vector corresponding to each sub-band.

Preferably, the step of directed to each of the sub-bands respectively, adopting the sub-band beamforming vector corresponding to the sub-band to determine the two polarized-direction beamforming vectors corresponding to the sub-band comprises:

for the $n^{th}$ sub-band, setting the latter I/2 elements in I elements of the sub-band beamforming vector corresponding to the $n^{th}$ sub-band as zero and using the obtained beamforming vector as one of the polarized-direction beamforming vectors corresponding to the $n^{th}$ sub-band wherein I represents the antenna number of the base station, n=1, 2, . . . , Ng, and Ng represents the total number of the sub-bands.

for the $n^{th}$ sub-band, setting the former I/2 elements in I elements of the sub-band beamforming vector corresponding to the $n^{th}$ sub-band as zero and using the obtained beamforming vector as the other polarized-direction beamforming vector corresponding to the $n^{th}$ sub-band.

According to another aspect of the present application, a device for dual layer beamforming is disclosed, the device comprising:

a signal receiving module configured to receive sounding reference signal (SRS) sent by the terminal wherein the broadband occupied when sending SRS, is divided into a plurality of sub-bands by the terminal;

a first determination module configured to determine the broadband beamforming vector corresponding to the broadband and the sub-band beamforming vector corresponding to each sub-band respectively according to the SRS;

a second determination module configured to determine two polarized-direction beamforming vectors corresponding to each sub-band respectively according to the broadband beamforming vector corresponding to the broadband or the sub-band beamforming vector corresponding to each sub-band;

and a dual layer beamforming module configured for, directed to each sub-band, adopting the two polarized-direction beamforming vectors corresponding to the sub-band for dual layer beamforming.

Preferably, the first determination module comprises:

a matrix determining module configured to determine the channel covariance matrix $\overline{R}$ of the broadband and the channel covariance matrix $\overline{R}_n$ of the $n^{th}$ sub-band according to the SRS wherein n=1, 2 . . . , Ng, and Ng represents the total number of the sub-bands;

an initial determination module configured to determine the initial broadband beamforming vector $w_1$ corresponding to the broadband according to the channel covariance matrix of the broadband and the initial sub-band beamforming vector $w_{n1}$ corresponding to the $n^{th}$ sub-band according to the channel covariance matrix of the $n^{th}$ sub-band;

a vector determining module configured to take phase operation for the initial broadband beamforming vector corresponding to the broadband to determine the broadband beamforming vector w corresponding to the broadband and take phase operation for the initial sub-band beamforming vector corresponding to the $n^{th}$ sub-band to determine the sub-band beamforming vector $w_n$ corresponding to the $n^{th}$ sub-band.

Preferably, when sending the SRS, the terminal occupies K sub-carriers and each sub-band comprises $N_{sc}$ sub-carriers wherein $N_{sc}<K$;

And the matrix determining module is configured specifically for:

utilizing the SRS to estimate the frequency domain channel and obtaining the channel estimation matrix of each sub-carrier wherein the channel estimation matrix of the $k^{th}$ sub-carrier is $H_k$:

$$H_k=[h_k^1\ h_k^2\ \ldots\ h_k^I]$$

calculating the channel covariance matrix of each sub-carrier wherein the channel covariance matrix of the $k^{th}$ sub-carrier is $R_k$:

$$R_k=H_k^H H_k$$

calculating the channel covariance matrix $\overline{R}_n$ of the $n^{th}$ sub-band according to the channel covariance matrix of the sub-carrier included in the $n^{th}$ sub-band.

$$\overline{R}_n = \frac{1}{N_{sc}^n} \sum_{k=N'+1}^{N'+N_{sc}^n} R_k$$

calculating the channel covariance matrix $\overline{R}$ of the broadband according to the channel covariance matrix of each sub-band:

$$\overline{R} = \frac{1}{Ng} \sum_{n=1}^{Ng} \overline{R}_n$$

Wherein k=1, 2, . . . , K; I represents the antenna number of the base station, $N_{sc}^n$ represents the number of sub-carriers included in the $n^{th}$ sub-band, N' represents the total number of sub-carriers included in the former n−1 sub-bands and $H_k^H$ represents the transposed-conjugate matrix of $H_k$.

Preferably, the initial determination module is configured specifically for:

setting the iterative times M and the initial iterative value $x^1=A^T$ wherein A is the matrix of row 1 and column I, all elements in A are 1, $A^T$ represents the transposed matrix of A and I represents the antenna number of the base station; and setting the initial value of m as 1;

calculating the intermediate parameter $y^{m+1}$ corresponding to the broadband: $y^{m+1}=\overline{R}*x^m$;

finding the most significant bit for the real part and the imaginary part of each element in the intermediate parameter $y^{m+1}$ corresponding to the broadband and intercepting 15 bits downward from the most significant bit of each element in the intermediate parameter $y^{m+1}$ corresponding to the broadband to obtain $x^{m+1}$;

judging whether m satisfies m≥M;

letting m=m+1 and returning to the step of calculating the intermediate parameter $y^{m+1}$ corresponding to the broadband if it is negative;

determining the $x^{m+1}$ as the initial broadband beamforming vector $w_1$ corresponding to the broadband if it is positive.

Preferably, the vector determining module is configured specifically for:

calculating the broadband beamforming vector w corresponding to the broadband according to following formula:

$$w=x^{m+1}/\|x^{m+1}\|$$

Wherein $\|x^{m+1}\|$ represents the absolute value of each element in $x^{m+1}$.

Preferably, the initial determination module is configured specifically for:

setting the iterative times M and the initial iterative value $x^1 = A^T$ wherein A is the matrix of row 1 and column I, all elements in A are 1, $A^T$ represents the transposed matrix of A and I represents the antenna number of the base station; and setting the initial value of m as 1;

calculating the intermediate parameter $y_n^{m+1}$ corresponding to the $n^{th}$ sub-band: $y_n^{m+1} = \overline{R_n} * x_n^m$;

finding the most significant bit for the real part and the imaginary part of each element in the intermediate parameter $y_n^{m+1}$ corresponding to the $n^{th}$ sub-band and intercepting 15 bits downward from the most significant bit of each element in the intermediate parameter $y_n^{m+1}$ corresponding to the $n^{th}$ sub-band to obtain $x_n^{m+1}$;

judging whether m satisfies m≥M;

letting m=m+1 and returning to the step of calculating the intermediate parameter $y_n^{m+1}$ corresponding to the $n^{th}$ sub-band if it is negative;

determining the $x_n^{m+1}$ as the initial sub-band beamforming vector $w_{n1}$ corresponding to the $n^{th}$ sub-band if it is positive.

Preferably, the vector determining module is configured specifically for:

calculating the sub-band beamforming vector $w_n$ corresponding to the $n^{th}$ sub-band according to following formula:

$$w_n = x_n^{m+1} / \|x_n^{m+1}\|$$

Wherein $\|x_n^{m+1}\|$ represents the absolute value of each element in $x_n^{m+1}$.

Preferably, the second determination module comprises:

a channel detecting module configured to detect the change situation of the channel occupied by the terminal when sending the SRS;

a broadband determining module configured for directed to each of the sub-bands, adopting the broadband beamforming vector to determine the two polarized-direction beamforming vectors corresponding to the sub-band, when the change of the channel is slow as detected by the channel detecting module;

a sub-band determining module configured for directed to each of the sub-bands, adopting the sub-band beamforming vector corresponding to the sub-band to determine the two polarized-direction beamforming vectors corresponding to the sub-band, when the change of the channel is quick as detected by the channel detecting module.

Preferably, the channel detecting module is specifically configured for:

acquiring the data of channel quality indicator (CQI) corresponding to each of the sub-bands;

calculating the difference value between the maximum CQI data and the minimum CQI data thereof;

comparing the difference value with the preset initial threshold;

determining the change of the channel to be slow, if the difference value is less than or equal to the initial threshold;

determining the change of the channel to be quick, if the difference value is greater than the initial threshold.

Preferably, the broadband detecting module is specifically configured for:

setting the latter I/2 elements in I elements of the broadband beamforming vector as zero and using the obtained beamforming vector as one of the polarized-direction beamforming vectors corresponding to each sub-band wherein I represents the antenna number of the base station;

setting the former I/2 elements in I elements of the broadband beamforming vector as zero and using the obtained beamforming vector as the other beamforming polarized-direction vector corresponding to each sub-band.

Preferably, the sub-band detecting module is specifically configured for:

for the $n^{th}$ sub-band, setting the latter I/2 elements in I elements of the sub-band beamforming vector corresponding to the $n^{th}$ sub-band as zero and using the obtained beamforming vector as one of the polarized-direction beamforming vectors corresponding to the $n^{th}$ sub-band wherein I represents the antenna number of the base station, n=1, 2, . . . , Ng, and Ng represents the total number of the sub-bands.

for the $n^{th}$ sub-band, setting the former I/2 elements in I elements of the sub-band beamforming vector corresponding to the $n^{th}$ sub-band as zero and using the obtained beamforming vector as the other polarized-direction beamforming vector corresponding to the $n^{th}$ sub-band.

According to another aspect of the present application, a computer readable recording medium recorded with the program for executing the above method is disclosed.

Compared with prior art, the present application comprises following advantages:

The base station of the present application may, after receiving SRS sent by the terminal, determine the broadband beamforming vector corresponding to the broadband and the sub-band beamforming vector corresponding to each sub-band respectively according to the SRS firstly; then determine two polarized-direction beamforming vectors corresponding to each sub-band according to the broadband beamforming vector corresponding to the broadband or the sub-band beamforming vector corresponding to each sub-band; and finally directed to each sub-band, adopt the two polarized-direction beamforming vectors corresponding to the sub-band for dual layer beamforming. In the present application, the calculation method for the beamforming vector in EBB method is adopted to calculate the broadband beamforming vector corresponding to the broadband and the sub-band beamforming vector corresponding to each sub-band, and then the calculation method for two polarized-direction beamforming vectors in GOB method is adopted to calculate the two polarized-direction beamforming vectors corresponding to each sub-band, which may better ensure the power and the direction accuracy of the second polarized direction compared with EBB method and may better match with the characteristics of the channel and be more applicable to the NLOS channel compared with GOB method. In addition, without the need of calculating DOA, it is easier to realize the sub-band beamforming and applicable to the channel with quicker frequency change than GOB method.

DESCRIPTION OF THE EMBODIMENTS

To make one of the above purposes, features and advantages of the present application more apparent and easily understood, the present application will be further explained in detail in combination with the drawings and detailed embodiments below.

Figure 1:
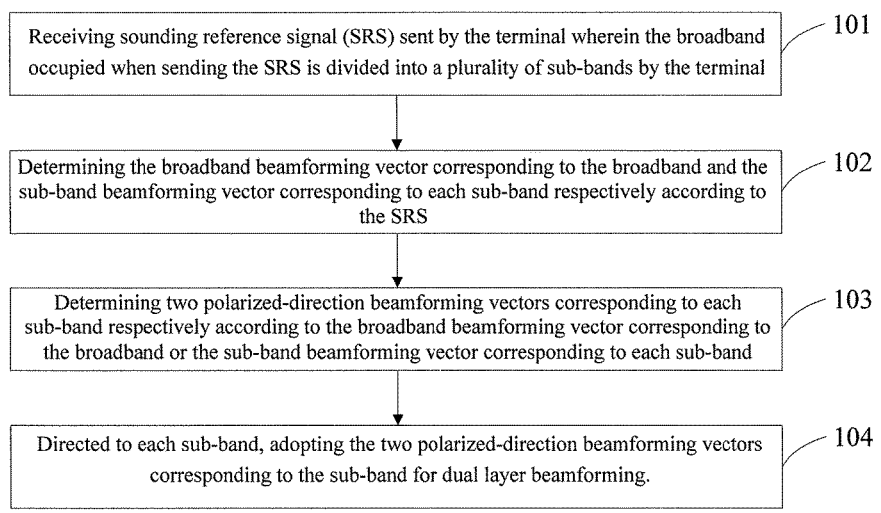
FIG. 1 is a flow chart of a method for dual layer beamforming according to embodiment One of the present application.

Embodiment One:

With reference to FIG. 1, a flow chart of a method for dual layer beamforming according to embodiment One of the present application is shown and the method may comprise following detailed steps of:

Step 101, receive sounding reference signal (SRS) sent by the terminal wherein the broadband occupied when sending SRS is divided by the terminal into a plurality of sub-bands.

In the embodiment of the present application, the terminal sends SRS to the base station by the single antenna and the base station receives the SRS by the dual polarized antenna.

Dual polarized antenna is a novel antenna technology, combining two mutually orthogonal antennas in polarized directions of +45° and −45° and working under the duplex mode of receiving and sending. Therefore, the most prominent advantage thereof is saving the number of single antenna oriented to the base station. Meanwhile, since in the dual polarized antenna, the polarized orthogonality of ±45° can ensure that the isolation between the two antennas of +45° and −45° satisfies the requirement of inter-modulation for the isolation between antennas (≥30 dB) so that the space interval between dual polarized antennas only needs 20-30 cm. In addition, the polarized antenna has the same advantage as electrically controlled antenna and as with the electrically controlled antenna, using the dual polarized antenna in the mobile communication network may reduce the call loss, decrease the interference and improve the service quality of the whole network.

In the LTE (Long Term Evolution) system, to realize the upper-row frequency domain modulation, the terminal not only needs to send the demodulation reference signal within its own data transmission band, but also needs to send SRS (SRS is a kind of "broadband" reference signal) within a broadband which is greater to the data transmission band for the detection of the channel, thereby realizing one of the purposes of helping the base station to allocate the upper-row transmission resources for the terminal.

In the embodiment of the present application, when sending the SRS, the terminal will occupies a plurality of PRBs and the broadband occupied when sending the SRS may be divided into a plurality of sub-bands by the terminal. For example, 96 PRBs are occupied to send the SRS (namely, the occupied broadband comprises 96 PRBs) and the beamforming granularity may be set as 12 (namely, every 12 PRBs are used as one sub-band) so that the broadband occupied by the SRS may be divided into 8 sub-bands. Of course, the above specific values are only used as examples but not for limiting the embodiment of the present application.

Step 102, determining the broadband beamforming vector corresponding to the broadband and the sub-band beamforming vector corresponding to each sub-band respectively according to the SRS;

The base station may, after receiving the SRS, determine the broadband beamforming vector corresponding to the broadband and the sub-band beamforming vector corresponding to each sub-band respectively according to the SRS, the specific process of which will be discussed specifically in embodiment Two below.

Step 103, determining two polarized-direction beamforming vectors corresponding to each sub-band respectively according to the broadband beamforming vector corresponding to the broadband or the sub-band beamforming vector corresponding to each sub-band;

In the embodiment of the present application, directed at different cases, the calculation of the two polarized-direction beamforming vectors corresponding to each sub-band may be performed selectively based on the broadband beamforming vector corresponding to the broadband or the sub-band beamforming vector corresponding to each sub-band. For example, it may be chosen according to the change situation of the channel or the like.

Step 104, directed to each sub-band, adopting the two polarized-direction beamforming vectors corresponding to the sub-band for dual layer beamforming.

After determining the two polarized-direction beamforming vectors corresponding to each sub-band, directed to each sub-band, the two polarized-direction beamforming vectors corresponding to the sub-band may be adopted for dual layer beamforming until all sub-bands are processed.

In the above steps 101-102, the broad beamforming vector corresponding to the broadband and the sub-band beamforming vector corresponding to each sub-band are calculated according to the calculation method for the beamforming vector in EBB method and in the steps 103-104, the two polarized-direction beamforming vectors corresponding to each sub-band are calculated according to the calculation method for two polarized-direction beamforming vectors in GOB method. The method according to the embodiment of the present application may better ensure the power and the direction accuracy of the second polarized direction compared with EBB method and may better match with the characteristics of the channel and be more applicable to the NLOS channel compared with GOB method. In addition, without the need of calculating DOA, it is easier to realize the sub-band beamforming and applicable to the channel with quicker frequency change than GOB method.

Embodiment Two

Hereinafter, the method for dual layer beamforming will be described in detail through embodiment Two of the present application.

Figure 2:
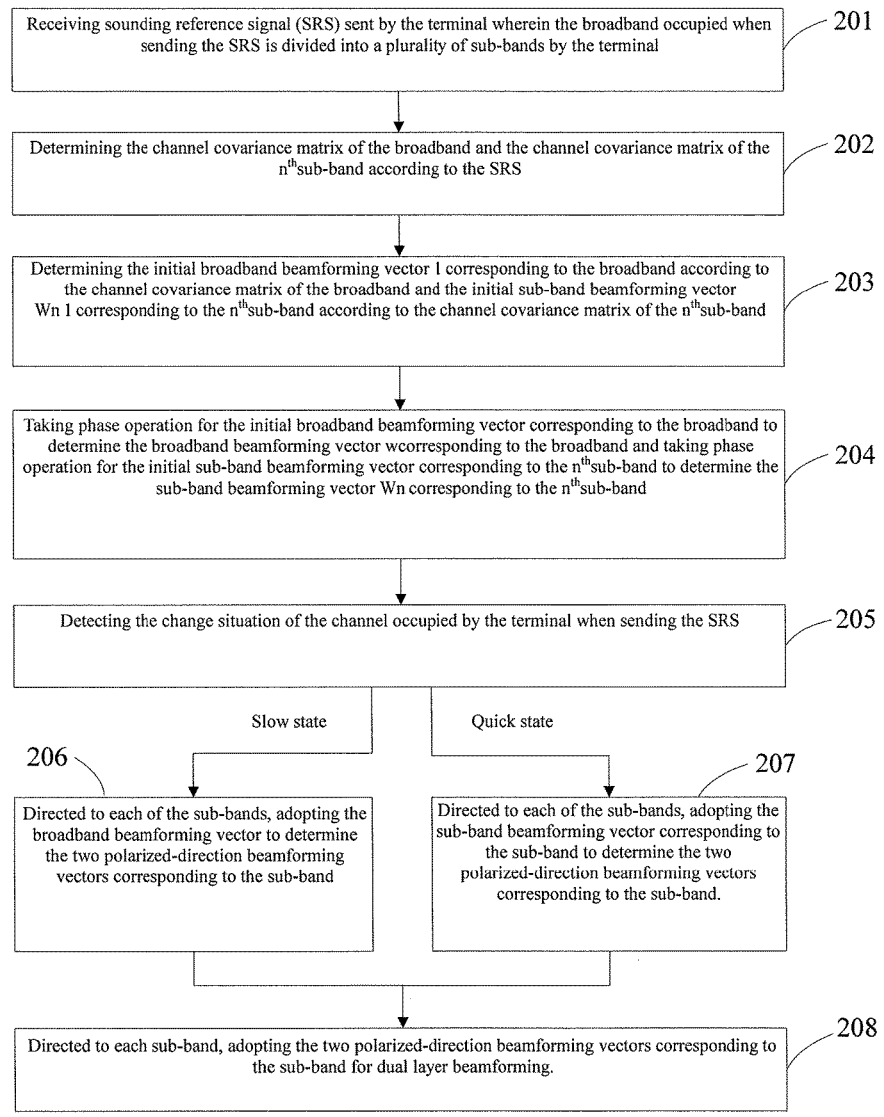
FIG. 2 is a flow chart of a method for dual layer beamforming according to embodiment Two of the present application.

With reference to FIG. 2, a flow chart of a method for dual layer beamforming according to embodiment Two of the present application is shown and the method may comprise following detailed steps of:

Step 201, receive sounding reference signal (SRS) sent by the terminal wherein the broadband occupied when sending SRS is divided by the terminal into a plurality of sub-bands.

In the embodiment of the present application, when sending SRS, the terminal may divide the broadband occupied by the SRS into a plurality of sub-bands for sending. In one preferred embodiment of the present application, it may be divided according to the PRB number occupied by the SRS and the preset beamforming granularity, and the sub-band number of the time is equal to the number of the PRB occupied by the SRS divided by the beamforming granularity. For example, the SRS occupies 96 PRBs and the beamforming granularity is 12, then the broadband occupied by the SRS may be divided into 8 sub-bands.

For the above specific values of the beamforming granularity, those skilled in the art may make related settings according to practical experience. Of course, other methods may be adopted to divide the sub-band, which will not be limited by the embodiment of the present application herein.

Step 202, determining the channel covariance matrix $\overline{R}$ of the broadband and the channel covariance matrix $\overline{R_n}$ of the $n^{th}$ sub-band according to the SRS comprises:

The step 202 may comprise following detailed steps of:

Sub-step a1, utilizing the SRS to estimate the frequency domain channel and obtaining the channel estimation matrix of each sub-carrier wherein the channel estimation matrix of the $k^{th}$ sub-carrier is $H_k$:

$$H_k = [h_k^1 \ h_k^2 \ \ldots \ h_k^I] \qquad \text{Formula 1}$$

According to the definition of the protocol, SRS will occupy a plurality of sub-carriers within one PRB. In the embodiment of the present application, when sending the SRS, the terminal occupies K sub-carriers and each sub-band comprises $N_{sc}$ sub-carriers wherein $N_{sc} < K$. For example, the broadband occupied by the SRS comprises 96 PRBs, each sub-band comprises 12 PRBs and the SRS occupies 6 sub-carriers within one PRB, therefore, the number of the sub-carriers occupied by the terminal when sending the SRS is 576 (96×6) and the number of the sub-carriers $N_{sc}$ included in each sub-band is 72 (12×6).

In the above formula 1, I represents the antenna number at the base station, $k=1, 2, \ldots, k$; and the channel estimation matrix of each sub-carrier also may be calculated according to the above formula 1. For example, in the case of the base station having 8 antennas, the channel estimation matrix of the $k^{th}$ sub-carrier is $H_k = [h_k^1 \ h_k^2 \ h_k^3 \ h_k^4 \ h_k^5 \ h_k^6 \ h_k^7 \ h_k^8]$.

Sub-step a2, calculating the channel covariance matrix of each sub-carrier wherein the channel covariance matrix of the $k^{th}$ sub-carrier is $R_k$:

$$R_k = H_k^H H_k \qquad \text{Formula 2}$$

In the above formula 2, $H_k^H$ represents the transposed conjugate matrix of $H_k$, $k=1, 2, \ldots, k$; and the channel covariance matrix of each carrier may also be calculated according to the above formula 2.

Sub-step a3, calculating the channel covariance matrix $\overline{R_n}$ of the $n^{th}$ sub-band according to the channel covariance matrix of the sub-carrier included in the $n^{th}$ sub-band:

$$\overline{R}_n = \frac{1}{N_{sc}^n} \sum_{k=N'+1}^{N'+N_{sc}^n} R_k \qquad \text{Formula 3}$$

After calculating the channel covariance matrices of all sub-carriers through steps a1-a2, directed at each sub-band, the channel covariance matrix of the sub-band may be calculated. In the above formula 3, $N_{sc}^n$ represents the number of the sub-carriers included in the $n^{th}$ sub-band and N' represents the total number of the sub-carriers included in the former n−1 sub-bands wherein $n=1, 2, \ldots, Ng$, Ng represents the total number of the sub-bands and the channel covariance matrices of all sub-bands may also be calculated according to the above formula 3.

Sub-step a4, calculating the channel covariance matrix $\overline{R}$ of the broadband according to the channel covariance matrix of each sub-band $$\overline{R} = \frac{1}{Ng} \sum_{n=1}^{Ng} \overline{R}_n \qquad \text{Formula 4}$$

After calculating the channel covariance matrices of all sub-bands through the sub-step a3, the channel covariance matrix of the broadband may be calculated based on the channel covariance matrices of all sub-bands according to the above formula 4.

Step 203, determining the initial broadband beamforming vector $w_1$ corresponding to the broadband according to the channel covariance matrix of the broadband and the initial sub-band beamforming vector $w_{n1}$ corresponding to the $n^{th}$ sub-band according to the channel covariance matrix of the $n^{th}$ sub-band.

In the step 203, the step of determining the initial broadband beamforming vector $w_1$ corresponding to the broadband according to the channel covariance matrix of the broadband may comprise following detailed steps of:

Sub-step b11, setting the iterative times M and the initial iterative value $x^1 = A^T$.

In the embodiment of the present application, the initial value of m may be set as 1 wherein A is the matrix of row 1 and column I, all elements in A are 1, $A^T$ represents the transposed matrix of A and I represents the antenna number of the base station. For example, in the case of the base station having 8 antennas, $x^1 = [1 \ 1 \ 1 \ 1 \ 1 \ 1 \ 1 \ 1]^T$.

Sub-step b12, calculating the intermediate parameter $y^{m+1}$ corresponding to the broadband:

$$y^{m+1} = \overline{R} * x^m \qquad \text{Formula 5}$$

In the above formula 5, $\overline{R}$ is the channel covariance matrix of the broadband calculated in the step 202.

Sub-step b13, finding the most significant bit for the real part and the imaginary part of each element in the intermediate parameter $y^{m+1}$ corresponding to the broadband and intercepting 15 bits downward from the most significant bit of each element in the intermediate parameter $y^{m+1}$ corresponding to the broadband to obtain $x^{m+1}$;

The most significant bit is the $(n-1)^{th}$ bit of binary digits with n bits and has the highest weight value $2^{n-1}$. For the specific process of the sub-step b13, those skilled in the art may make related processing according to practical experience which will not be limited by the embodiment of the present application herein.

Sub-step b14, judging whether m satisfies $m \geq M$;

Judging whether m satisfies $m \geq M$, that is, determining whether the iteration is completed; letting $m = m+1$ and returning to the step b12 if it is negative; and determining the $x^{m+1}$ as the initial broadband beamforming vector $w_1$ corresponding to the broadband if it is positive.

In the step 203, the step of determining the initial sub-band beamforming vector $w_1$ corresponding to the $n^{th}$ sub-band according to the channel covariance matrix of the $n^{th}$ sub-band may comprise following detailed steps of:

Sub-step b21, setting the iterative times M and the initial iterative value $x^1 = A^T$.

In the embodiment of the present application, the initial value of m may be set as 1 wherein A is the matrix of row 1 and column I, all elements in A are 1, $A^T$ represents the transposed matrix of A and I represents the antenna number of the base station. For example, in the case of the base station having 8 antennas, $x^1 = [1 \ 1 \ 1 \ 1 \ 1 \ 1 \ 1 \ 1]^T$.

Sub-step b22, calculating the intermediate parameter $y_n^{m+1}$ corresponding to the $n^{th}$ sub-band:

$$y_n^{m+1} = \overline{R_n} * x_n^m \qquad \text{Formula 6}$$

In the above formula 6, $\overline{R_n}$ is the channel covariance matrix of the $n^{th}$ sub-band calculated in the step 202.

Sub-step b23, finding the most significant bit for the real part and the imaginary part of each element in the intermediate parameter $y_n^{m+1}$ corresponding to the $n^{th}$ sub-band and intercepting 15 bits downward from the most significant bit of each element in the intermediate parameter $y_n^{m+1}$ corresponding to the $n^{th}$ sub-band to obtain $x_n^{m+1}$.

Sub-step b24, judging whether m satisfies m≥M;

Judging whether m satisfies m≥M, that is, determining whether the iteration is completed; letting m=m+1 and returning to the step b22 if it is negative; and determining the $x_n^{m+1}$ as the initial sub-band beamforming vector $w_1$ corresponding to the $n^{th}$ sub-band if it is positive.

Wherein n=1, 2, . . . , Ng, Ng represents the total number of the sub-bands and for each sub-band, the initial sub-band beamforming vector corresponding to the sub-band may be calculated by the above sub-steps b21-b24 until all sub-bands are calculated.

Step 204, taking phase operation for the initial broadband beamforming vector corresponding to the broadband to determine the broadband beamforming vector corresponding to the broadband and taking phase operation for the initial sub-band beamforming vector corresponding to the $n^{th}$ sub-band to determine the sub-band beamforming vector $w_n$ corresponding to the $n^{th}$ sub-band.

After calculating the initial broadband beamforming vector corresponding to the broadband and the initial sub-band beamforming vectors corresponding to all sub-bands in step 203, the phase operation may be taken for the initial broadband beamforming vector and the initial sub-band beamforming vectors respectively.

In the step 204, the step of taking phase operation for the initial broadband beamforming vector corresponding to the broadband to determine the broadband beamforming vector corresponding to the broadband may specifically comprise: calculating the broadband beamforming vector w corresponding to the broadband according to following formula:

$$w = x^{m+1}/\|x^{m+1}\| \quad \text{Formula 7}$$

In the formula 7, $\|x^{m+1}\|$ represents the absolute value of each element in $x^{m+1}$, that is, the vector obtained through dividing each element in $w_1$ by the absolute value of the element is the broadband beamforming vector w corresponding to the broadband.

In the step 204, the step of taking phase operation for the initial sub-band beamforming vector corresponding to the $n^{th}$ sub-band to determine the sub-band beamforming vector $w_n$ corresponding to the sub-band may specifically comprise: calculating the sub-band beamforming vector $w_n$ corresponding to the $n^{th}$ sub-band according to following formula:

$$w_n = x_n^{m+1}/\|x_n^{m+1}\| \quad \text{Formula 8}$$

In the above formula 8, $\|x_n^{m+1}\|$ represents the absolute value of each elements in $x_n^{m+1}$, that is, the vector obtained through dividing each element in $_{n1}$ by the absolute value of the element and is the broadband beamforming vector $w_n$ corresponding to the broadband Wherein n=1, 2, . . . , Ng, Ng represents the total number of the sub-bands and for each sub-band, the initial sub-band beamforming vector corresponding to the sub-band may be calculated according to the above formula 8 until all sub-bands are calculated.

The above steps 202-204 is the detailed process of the step 102 in embodiment One.

Step 205, detecting the change situation of the channel occupied by the terminal when sending the SRS;

After calculating the broadband beamforming vector corresponding to the broadband and the sub-band beamforming vector corresponding to each sub-band through the steps 201-204, the broadband beamforming vector corresponding to the broadband or the sub-band beamforming vector corresponding to the sub-band thereof may be chosen to determine the two polarized-direction beamforming vectors corresponding to each sub-band.

In the embodiment of the present application, it may be chosen according to the change situation of the channel occupied by the terminal when sending the SRS. Therefore, the change situation of the channel occupied by the terminal when sending the SRS may be detected. If the change of the channel is slow, execute the step 206; and if the change of the channel is quick, execute the step 207.

In one preferred embodiment of the present application, the judgment of the change situation of the channel may be based on the sub-band CQI (Channel Quality Indicator) results of the SRS. The step 205 may comprise following detailed steps of:

Sub-step c1, acquiring the data of channel quality indicator (CQI) corresponding to each sub-band;

CQI is a measurement standard of the communication quality of the wireless channel and can represents the channel measurement standard of one given channel. Generally, higher CQI represents better quality of the corresponding channel and vice versa. The CQI data for a channel may be calculated by means of performance indicators, such as SNR (Signal to Noise Ratio), SINR (Signal to Interference plus Noise Ratio), SNDR (Signal to Noise Distortion Ratio) and the like.

In the embodiment of the present application, during the estimation of the frequency domain channel for the SRS, the CQI data corresponding to each sub-band may be calculated and the detailed process of calculating the CQI data may refer to the commonly used calculation methods at present, which will not be discussed any more in the embodiment of the present application herein.

Sub-step c2, calculating the difference value between the maximum CQI data and the minimum CQI data;

After acquiring the CQI data corresponding to each sub-band, finding the maximum CQI data (cqi_max) and the minimum CQI data (cqi_mim), and calculating the difference value (delta_cqi) between the cqi_max and cqi_mim.

Sub-step c3, comparing the difference value with the preset initial threshold;

In the embodiment of the present application, an initial threshold (delta_cqi_threshold) may be preset and the above delta_cqi may be compared with the delta_cqi_threshold.

determining the change of the channel to be slow, if the difference value is less than or equal to the initial threshold; and determining the change of the channel to be quick, if the difference value is greater than the initial threshold. The specific value for the above initial threshold will not be limited by the embodiment of the present application.

Of course, in the embodiment of the present application, the change situation of the channel occupied by the terminal when sending the SRS may be detected according to other performance indicators, such as the frequency of the channel, which will not be limited by the embodiment of the present application.

Step 206, directed to each of the sub-bands, adopting the broadband beamforming vector to determine the two polarized-direction beamforming vectors corresponding to the sub-band. Then, executing step 208.

Since the base station of the embodiment of the present application adopts the polarized antenna to receive SRS, during the beamforming, it is necessary for beamforming in two polarized directions. If the change of the channel is slow as detected in the step 205, it can explain that the difference in the channels corresponding to each sub-band is small and in this case, the broadband beamforming vector w corresponding to the broadband as calculated in the step 204 may be chosen to determine the two polarized-direction beamforming vectors corresponding to each sub-band. That is, directed to each sub-band, the broadband beamforming vector may be adopted to determine the two polarized-direction beamforming vectors corresponding to the sub-band.

The step 206 may comprise following sub-steps of:

Sub-step d1, setting the latter I/2 elements in I elements of the broadband beamforming vector as zero and using the obtained forming vector as one of the polarized-direction beamforming vectors corresponding to each sub-band.

Sub-step d2, setting the former I/2 elements in I elements of the broadband beamforming vector as zero and using the obtained forming vector as the other polarized-direction beamforming vector corresponding to each sub-band Wherein I represents the antenna number of the base station. Since all sub-bands are calculated by adopting the broadband beamforming vector, the beamforming vectors corresponding to all sub-bands are identical and the two polarized-direction beamforming vectors calculated in the above steps d1-d2 may be used as the two polarized-direction beamforming vectors corresponding to each sub-band.

For example, in the case of the base station having 8 antennas, if the broadband beamforming vector calculated in the step 204 is w=[w(0) w(1) w(2) w(3) w(4) w(5) w(6) w(7)], then the two polarized-direction beamforming vectors corresponding to each sub-band calculated in the step 206 respectively are:

$$\text{bf\_vector1} = [\, w(0) \quad w(1) \quad w(2) \quad w(3) \quad 0 \quad 0 \quad 0 \quad 0\,]^H$$
$$\text{bf\_vector2} = [\, 0 \quad 0 \quad 0 \quad 0 \quad w(4) \quad w(5) \quad w(6) \quad w(7)\,]^H$$

Wherein, bf_vector1 is one of the polarized-direction beamforming vectors corresponding to each sub-band and bf_vector2 is the other polarization-direction beamforming vector corresponding to each sub-band.

Step 207, directed to each of the sub-bands, adopting the sub-band beamforming vector corresponding to the sub-band to determine the two polarized-direction beamforming vectors corresponding to the sub-band. Then, executing step 208.

If the change of the channel is quick as detected in the step 205, it can explain that the difference in the channel corresponding to each sub-band is relatively great and in this case, the sub-band beamforming vector corresponding to each sub-band as calculated in the step 204 may be chosen to determine the two polarized-direction beamforming vectors corresponding to each sub-band. That is, directed to each of the sub-bands, the sub-band beamforming vector is adopted to determine the two polarized-direction beamforming vectors corresponding to the sub-band.

The step 207 may comprise following sub-steps of:

Sub-step e1, for the $n^{th}$ sub-band, setting the latter I/2 elements in I elements of the sub-band beamforming vector corresponding to the $n^{th}$ sub-band as zero and using the obtained beamforming vector as one of the polarized-direction beamforming vectors corresponding to the $n^{th}$ sub-band.

Sub-step e2, for the $n^{th}$ sub-band, setting the former I/2 elements in I elements of the sub-band beamforming vector corresponding to the $n^{th}$ sub-band as zero and using the obtained forming vector as the other polarized-direction beamforming vector corresponding to the $n^{th}$ sub-band Wherein I represents the antenna number of the base station, n=1, 2, . . . , Ng and Ng represents the total number of the sub-bands. Directed to each sub-band, the two polarized-direction beamforming coefficients are calculated by the above sub-steps e1-e2 until all sub-bands are calculated.

For example, in the case of the base station having 8 antennas, if the sub-band beamforming vector corresponding to the $n^{th}$ sub-band as calculated in the above step 204 $w_n$=[$w_n$(0) $w_n$(1) $w_n$(2) $w_n$(3) $w_n$(4) $w_n$(5) $w_n$(6) $w_n$(7)], then the two polarized-direction beamforming vectors corresponding to the $n^{th}$ sub-band as calculated in the step 207 respectively are:

$$\text{bf\_vector1}_n = [\, w_n(0) \quad w_n(1) \quad w_n(2) \quad w_n(3) \quad 0 \quad 0 \quad 0 \quad 0\,]^H$$
$$\text{bf\_vector2}_n = [\, 0 \quad 0 \quad 0 \quad 0 \quad w_n(4) \quad w_n(5) \quad w_n(6) \quad w_n(7)\,]^H$$

Wherein bf_vector1$_n$ is one of the polarized-direction beamforming vectors corresponding to the $n^{th}$ sub-band and bf_vector2$_n$ is the other polarized-direction beamforming vector corresponding to the $n^{th}$ sub-band.

The above steps 205-207 are the detailed process of the step 103 in embodiment One.

Step 208, directed to each sub-band, adopting the two polarized-direction beamforming vectors corresponding to the sub-band for dual layer beamforming.

After calculating the two polarized-direction beamforming vectors corresponding to each sub-band, directed to each sub-band, the two polarized-direction beamforming vectors corresponding to the sub-band may be adopted for dual layer beamforming. For example, directed to the SRS corresponding to each sub-band, the two polarized-direction beamforming vectors corresponding to the sub-band may be adopted respectively to weight the SRS, thereby completing the beamforming in two polarized directions. For the specific process of beamforming, those skilled in the art may make related processing according to practical experience which will not be limited by the embodiment of the present application herein.

In the embodiment of the present application, the dual layer beamforming is completed through combining EBB and GOB methods, which can solve the shortcomings existing in the above two methods respectively, thereby enhancing the beam directivity and improving the beamforming effect.

For brief description, the aforementioned each embodiment of the method is described as the combination of a series of actions. However, it should be known by those skilled in the art that the present application is not limited by the described action sequence because certain steps may adopt other sequences or be performed simultaneously according to the present application. Secondly, it also should be known by those skilled in the art that the embodiments described in the specification are preferred embodiments and the involved actions and modules are not the must of the present application necessarily.

Embodiment Three

Figure 3:
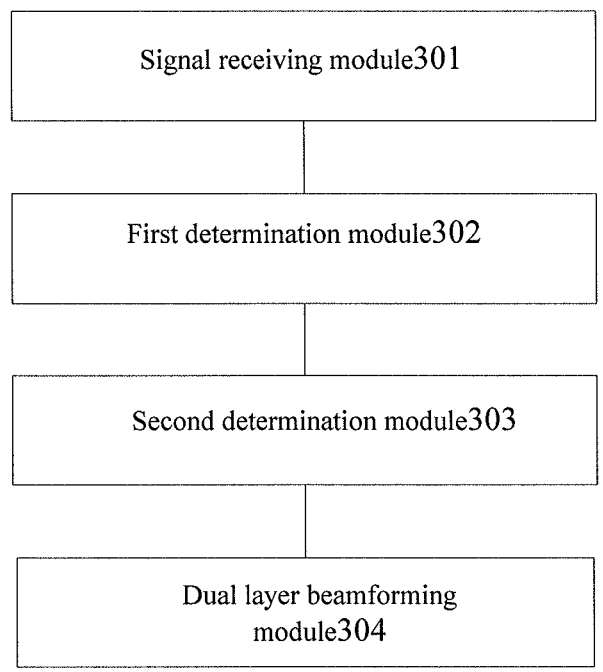
FIG. 3 is a structure diagram of a device for dual layer beamforming according to embodiment Three of the present application.

With reference to FIG. 3, a structure diagram of a device for dual layer beamforming according to embodiment Three of the present application is shown, the device comprising following modules of:

a signal receiving module 301 configured to receive sounding reference signal (SRS) sent by the terminal wherein the broadband occupied when sending the SRS is divided into a plurality of sub-bands by the terminal;

a first determination module 302 configured to determine the broadband beamforming vector corresponding to the broadband and the sub-band beamforming vector corresponding to each sub-band respectively according to the SRS;

a second determination module 303 configured to determine two polarized-direction beamforming vectors corresponding to each sub-band respectively according to the broadband beamforming vector corresponding to the broadband or the sub-band beamforming vector corresponding to each sub-band;

and a dual layer beamforming module 304 configured for directed to each sub-band, adopting the two polarized-direction beamforming vectors corresponding to the sub-band for dual layer beamforming.

In one preferred embodiment of the present application, the first determination module 302 may comprise following detailed modules of:

a matrix determining module configured to determine the channel covariance matrix $\overline{R}$ of the broadband and the channel covariance matrix $\overline{R_n}$ of the $n^{th}$ sub-band according to the SRS wherein n=1, 2 ..., Ng, and Ng represents the total number of the sub-bands;

an initial determination module configured to determine the initial broadband beamforming vector $w_1$ corresponding to the broadband according to the channel covariance matrix of the broadband and the initial sub-band beamforming vector $w_{n1}$ corresponding to the $n^{th}$ sub-band according to the channel covariance matrix of the $n^{th}$ sub-band;

a vector determining module configured to take phase operation for the initial broadband beamforming vector corresponding to the broadband to determine the broadband beamforming vector w corresponding to the broadband and take phase operation for the initial sub-band beamforming vector corresponding to the $n^{th}$ sub-band to determine the sub-band beamforming vector $w_n$ corresponding to the $n^{th}$ sub-band.

Wherein the terminal occupies K sub-carriers when sending the SRS and each sub-band comprises $N_{sc}$ sub-carriers wherein $N_{sc} < K$;

The matrix determining module may be configured specifically for:

utilizing the SRS to estimate the frequency domain channel and obtaining the channel estimation matrix of each sub-carrier wherein the channel estimation matrix of the $k^{th}$ sub-carrier is $H_k$:

$$H_k = [h_k^1 \ h_k^2 \ \ldots \ h_k^I]$$

calculating the channel covariance matrix of each sub-carrier wherein the channel covariance matrix of the $k^{th}$ sub-carrier is $R_k$:

$$R_k = H_k^H H_k$$

calculating the channel covariance matrix $\overline{R_n}$ of the $n^{th}$ sub-band according to the channel covariance matrix of the sub-carrier included in the $n^{th}$ sub-band.

$$\overline{R}_n = \frac{1}{N_{sc}^n} \sum_{k=N'+1}^{N'+N_{sc}^n} R_k$$

calculating the channel covariance matrix $\overline{R}$ of the broadband according to the channel covariance matrix of each sub-band:

$$\overline{R} = \frac{1}{Ng} \sum_{n=1}^{Ng} \overline{R}_n$$

Wherein k=1, 2, ..., K; I represents the antenna number of the base station, $N_{sc}^n$ represents the number of sub-carriers included in the $n^{th}$ sub-band, N' represents the total number of sub-carriers included in the former n−1 sub-bands and $H_k^H$ represents the transposed-conjugate matrix of $H_k$.

The initial determination module may be configured specifically for:

setting the iterative times M and the initial iterative value $x^1 = A^T$ wherein A is the matrix of row 1 and column I, all elements in A are 1, $A^T$ represents the transposed matrix of A and I represents the antenna number of the base station; and setting the initial value of m as 1;

calculating the intermediate parameter $y^{m+1}$ corresponding to the broadband: $y^{m+1} = \overline{R} * x^m$;

finding the most significant bit for the real part and the imaginary part of each element in the intermediate parameter $y^{m+1}$ corresponding to the broadband and intercepting 15 bits downward from the most significant bit of each element in the intermediate parameter $y^{m+1}$ corresponding to the broadband to obtain $x^{m+1}$;

judging whether m satisfies m≥M;

letting m=m+1 and returning to the step of calculating the intermediate parameter $y^{m+1}$ corresponding to the broadband if it is negative;

determining the $x^{m+1}$ as the initial broadband beamforming vector $w_1$ corresponding to the broadband if it is positive.

The initial determination module may also be configured specifically for:

setting the iterative times M and the initial iterative value $x^1 = A^T$ wherein A is the matrix of row 1 and column I, all elements in A are 1, $A^T$ represents the transposed matrix of A and I represents the antenna number of the base station; and setting the initial value of m as 1;

calculating the intermediate parameter $y_n^{m+1}$ corresponding to the $n^{th}$ sub-band: $y_n^{m+1} = \overline{R_n} * x_n^m$;

finding the most significant bit for the real part and the imaginary part of each element in the intermediate parameter $y_n^{m+1}$ corresponding to the $n^{th}$ sub-band and intercepting 15 bits downward from the most significant bit of each element in the intermediate parameter $y_n^{m+1}$ corresponding to the $n^{th}$ sub-band to obtain $x_n^{m+1}$;

judging whether m satisfies m≥M;

letting m=m+1 and returning to the step of calculating the intermediate parameter $y_n^{m+1}$ corresponding to the $n^{th}$ sub-band if it is negative;

determining the $x_n^{m+1}$ as the initial sub-band beamforming vector $w_{n1}$ corresponding to the $n^{th}$ sub-band if it is positive.

The vector determining module may be configured specifically for:

calculating the broadband beamforming vector w corresponding to the broadband according to following formula:

$$w = x^{m+1} / \|x^{m+1}\|$$

Wherein $\|x^{m+1}\|$ represents the absolute value of each element in $x^{m+1}$.

The vector determining module may also be configured specifically for:

calculating the sub-band beamforming vector $w_n$ corresponding to the $n^{th}$ sub-band according to following formula:

$$w_n = x_n^{m+1} / \|x_n^{m+1}\|$$

Wherein $\|x_n^{m+1}\|$ represents the absolute value of each element in $x_n^{m+1}$.

In one preferred embodiment of the present application, the second determination module 303 may comprise following detailed modules of:

a channel detecting module configured to detect the change situation of the channel occupied by the terminal when sending the SRS;

a broadband determining module configured for directed to each of the sub-bands, adopting the broadband beamforming vector to determine the two polarized-direction beamforming vectors corresponding to the sub-band, when the change of the channel is slow as detected by the channel detecting module;

a sub-band determining module configured for directed to each of the sub-bands, adopting the sub-band beamforming vector corresponding to the sub-band to determine the two polarized-direction beamforming vectors corresponding to the sub-band, when the change of the channel is quick as detected by the channel detecting module.

Wherein the channel detecting module may be specifically configured for:

acquiring the data of channel quality indicator (CQI) corresponding to each of the sub-bands;

calculating the difference value between the maximum CQI data and the minimum CQI data thereof;

comparing the difference value with the preset initial threshold;

determining the change of the channel to be slow, if the difference value is less than or equal to the initial threshold;

determining the change of the channel to be quick, if the difference value is greater than the initial threshold.

The broadband determining module may be configured specifically for:

setting the latter I/2 elements in I elements of the broadband beamforming vector as zero and using the obtained beamforming vector as one of the polarized-direction beamforming vectors corresponding to each sub-band wherein I represents the antenna number of the base station;

setting the former I/2 elements in I elements of the broadband beamforming vector as zero and using the obtained beamforming vector as the other beamforming polarized-direction vector corresponding to each sub-band.

The sub-band determining module may be configured specifically for:

for the $n^{th}$ sub-band, setting the latter I/2 elements in I elements of the sub-band beamforming vector corresponding to the $n^{th}$ sub-band as zero and using the obtained beamforming vector as one of the polarized-direction beamforming vectors corresponding to the $n^{th}$ sub-band wherein I represents the antenna number of the base station, n=1, 2, . . . , Ng, and Ng represents the total number of the sub-bands.

for the $n^{th}$ sub-band, setting the former I/2 elements in I elements of the sub-band beamforming vector corresponding to the $n^{th}$ sub-band as zero and using the obtained beamforming vector as the other polarized-direction beamforming vector corresponding to the $n^{th}$ sub-band.

In the embodiment of present application, the calculation method for the beamforming vector in EBB method is adopted to calculate the broadband beamforming vector corresponding to the broadband and the sub-band beamforming vector corresponding to each sub-band, and then the calculation method for two polarized-direction beamforming vectors in GOB method is adopted to calculate the two polarized-direction beamforming vectors corresponding to each sub-band, which may better ensure the power and the direction accuracy of the second polarized direction compared with EBB method and may better match with the characteristics of the channel and be more applicable to the NLOS channel compared with GOB method. In addition, without the need of calculating DOA, it is easier to realize the sub-band beamforming and applicable to the channel with quicker frequency change than GOB method.

For the embodiment of the device, the description is relatively simple because of its substantial similarity to the embodiment of the method, and the related parts may refer to the part description of the embodiment of the method.

Embodiment Four

The present application also discloses a computer readable recording medium recorded with the program for executing the above method.

The computer readable recording medium comprises any mechanism used for storing or transmitting information in a computer (such as a computer)readable manner. For example, the machine readable medium comprises the read-only memory (ROM), the random access memory (RAM), the disk memory medium, the optical memory medium, the flash memory medium, the transmitted signal in the form of electricity, light, sound or other forms (such as the carrier, the infrared signal and the digital signal) and the like.

Each embodiment in the specification is described in a progressive manner, the emphasis of each embodiment is put on explaining the difference from other embodiments and the same or similar parts of each embodiment may refer to each other.

The present application may be described in the general context of the computer executable instruction by the computer, such as the program module. In general, the program module comprises the routine, the program, the object, the component, the data structure and the like for executing a particular task or realizing particular abstract data type. The present application may also be implemented in distributed computing environments and in these distributed computing environments; the task is executed by the remote processing equipment connected by the communication network. In the distributed computing environment, the program module may be located in the local and remote computer storage media including the memory device.

At the end, it is to be explained that the relationship terms, such as "first" and "second", are used herein only for distinguishing one entity or operation from another entity or operation but do not necessarily require or imply that there exists any actual relationship or sequence of this sort between these entities or operations. Furthermore, terms "comprising", "including" or any other variants are intended to cover the non-exclusive including, thereby making that the process, method, merchandise or device comprising a series of elements comprise not only those elements but also other elements that are not listed explicitly or the inherent elements to the process, method, merchandise or device. In the case of no more limitations, the element limited by the sentence "comprising a . . . " does not exclude that there exists another same element in the process, method, merchandise or device comprising the element.

Hereinbefore, a method and device for dual layer beamforming provided by the present application are introduced in detail and the principle and execution mode of the present application are illustrated by applying particular examples while the above embodiments are illustrated only for aiding in understanding the method and the core concept thereof of the present application; Meanwhile, modifications may be made in the specific execution mode and application scope by those skilled in the art according to the concept of the present application. To sum up, the content of the specification should not be understood as limiting the present application.

What is claimed is:

1. A method for dual layer beamforming, the method comprising:

receiving, by a dual polarized antenna of a base station, a sounding reference signal (SRS) sent by an antenna of a terminal, wherein a broadband occupied when sending the SRS is divided into a plurality of sub-bands by the terminal;

determining a broadband beamforming vector corresponding to the broadband and a sub-band beamforming vector corresponding to each sub-band, respectively, according to the SRS;

selectively determining two polarized-direction beamforming vectors corresponding to each sub-band, respectively, according to the broadband beamforming vector corresponding to the broadband or the sub-band beamforming vector corresponding to each sub-band, by determining a channel covariance matrix of the broadband and a channel covariance matrix for each of the sub-bands according to the SRS; and directed to each sub-band, adopting the two polarized-direction beamforming vectors corresponding to the sub-band for dual layer beamforming until all sub-bands are processed.

2. The method according to claim 1, wherein determining the broadband beamforming vector corresponding to the broadband and the sub-band beamforming vector corresponding to each sub-band respectively according to the SRS comprises:

determining the channel covariance matrix $\overline{R}$ of the broadband and the channel covariance matrix $\overline{R_n}$ of an $n^{th}$ sub-band according to the SRS wherein n=1, 2 . . . , Ng and Ng represents a total number of the sub-bands;

determining an initial broadband beamforming vector $w_1$ corresponding to the broadband according to the channel covariance matrix of the broadband and an initial sub-band beamforming vector $w_{n1}$ corresponding to the $n^{th}$ sub-band according to the channel covariance matrix of the $n^{th}$ sub-band; and taking phase operation for the initial broadband beamforming vector corresponding to the broadband to determine the broadband beamforming vector w corresponding to the broadband and taking phase operation for the initial sub-band beamforming vector corresponding to the $n^{th}$ sub-band to determine the sub-band beamforming vector $w_n$ corresponding to the $n^{th}$ sub-band.

3. The method according to claim 2, wherein when sending the SRS, the terminal occupies K sub-carriers and each sub-band comprises $N_{sc}$ sub-carriers wherein $N_{sc}<K$; and determining the channel covariance matrix $\overline{R}$ of the broadband and the channel covariance matrix $\overline{R_n}$ of the $n^{th}$ sub-band according to the SRS comprises:

utilizing the SRS to estimate the frequency domain channel and obtaining the channel estimation matrix of each sub-carrier wherein the channel estimation matrix of the $k^{th}$ sub-carrier is $H_k$:

$H_k=[h_k^1 h_k^2 \ldots h_k^I]$ calculating the channel covariance matrix of each sub-carrier wherein the channel covariance matrix of the $k^{th}$ sub-carrier is $R_k$:

$R_k=H_k^H H_k$ calculating the channel covariance matrix $\overline{R_n}$ of the $n^{th}$ sub-band according to the channel covariance matrix of the sub-carrier included in the $n^{th}$ sub-band; and $$\overline{R}_n = \frac{1}{N_{sc}^n} \sum_{k=N'+1}^{N'+N_{sc}^n} R_k$$

calculating the channel covariance matrix $\overline{R}$ of the broadband according to the channel covariance matrix of each sub-band:

$$\overline{R} = \frac{1}{Ng} \sum_{n=1}^{Ng} \overline{R}_n$$

wherein k=1, 2, . . . , K; I represents the antenna number of the base station, $N_{sc}^n$ represents the number of sub-carriers included in the $n^{th}$ sub-band, N' represents a total number of sub-carriers included in former n−1 sub-bands and $H_k^H$ represents a transposed-conjugate matrix of $H_k$.

4. The method according to claim 2, wherein determining the initial broadband beamforming vector $w_1$ corresponding to the broadband according to the channel covariance matrix of the broadband comprises:

setting the iterative times M and the initial iterative value $x^1=A^T$ wherein A is the matrix of row 1 and column I, all elements in A are 1, $A^T$ represents a transposed matrix of A and I represents the antenna number of the base station; and setting the initial value of m as 1;

calculating the intermediate parameter corresponding to the broadband $y^{m+1}$: $y^{m+1}=\overline{R}*x^m$;

finding the most significant bit for the real part and the imaginary part of each element in the intermediate parameter $y^{m+1}$ corresponding to the broadband and intercepting 15 bits downward from the most significant bit of each element in the intermediate parameter $y^{m+1}$ corresponding to the broadband to obtain $x^{m+1}$;

judging whether m satisfies m≥M;

letting m=m+1 and returning to calculating the intermediate parameter $y^{m+1}$ corresponding to the broadband if it is negative; and determining the $x^{m+1}$ as the initial broadband beamforming vector $w_1$ corresponding to the broadband if it is positive.

5. The method according to claim 4, wherein taking phase operation for the initial broadband beamforming vector corresponding to the broadband to determine the broadband beamforming vector corresponding to the broadband comprises:

calculating the broadband beamforming vector w corresponding to the broadband according to following formula: $w=x^{m+1}/\|x^{m+1}\|$ wherein $\|x^{m+1}\|$ represents the absolute value of each element in $x^{m+1}$.

6. The method according to claim 2, wherein determining the initial sub-band beamforming vector $w_{n1}$ corresponding to the $n^{th}$ sub-band according to the channel covariance matrix of the $n^{th}$ sub-band comprises:

setting the iterative times M and the initial iterative value $x^1=A^T$ wherein A is the matrix of row 1 and column I, all elements in A are 1, $A^T$ represents a transposed matrix of A and I represents the antenna number of the base station; and setting the initial value of m as 1;

calculating the intermediate parameter $y_n^{m+1}$ corresponding to the $n^{th}$ sub-band: $y_n^{m+1}=\overline{R_n}*x_n^m$;

finding the most significant bit for the real part and the imaginary part of each element in the intermediate parameter $y_n^{m+1}$ corresponding to the $n^{th}$ sub-band and intercepting 15 bits downward from the most significant bit of each element in the intermediate parameter $y_n^{m+1}$ corresponding to the $n^{th}$ sub-band to obtain $x_n^{m+1}$;

judging whether m satisfies m≥M;

letting m=m+1 and returning to the step of calculating the intermediate parameter $y_n^{m+1}$ corresponding to the $n^{th}$ sub-band if it is negative; and determining the $x_n^{m+1}$ as the initial sub-band beamforming vector $w_{n1}$ corresponding to the $n^{th}$ sub-band if it is positive.

7. The method according to claim 6, wherein the step of taking phase operation for the initial sub-band beamforming vector corresponding to the $n^{th}$ sub-band to determine the sub-band beamforming vector $w_n$ corresponding to the $n^{th}$ sub-band comprises:

calculating the sub-band beamforming vector $w_n$ corresponding to the $n^{th}$ sub-band according to following formula: $w_n=x_n^{m+1}/\|x_n^{m+1}\|$;

wherein $\|x_n^{m+1}\|$ represents the absolute value of each element in $x_n^{m+1}$.

8. The method according to claim 1, wherein the determining of the two polarized-direction beamforming vectors corresponding to each sub-band respectively according to the broadband beamforming vector corresponding to the broadband or the sub-band beamforming vector corresponding to each sub-band comprises:

detecting a change situation of the channel occupied by the terminal when sending the SRS;

directed to each of the sub-bands, adopting the broadband beamforming vector to determine the two polarized-direction beamforming vectors corresponding to the sub-band, if the change of the channel is slow; and directed to each of the sub-bands respectively, adopting the sub-band beamforming vector corresponding to the sub-band to determine the two polarized-direction beamforming vectors corresponding to the sub-band, if the change of the channel is quick.

9. The method according to claim 8, wherein detecting the change situation of the channel occupied by the terminal when sending the SRS comprises:

acquiring the data of channel quality indicator (CQI) corresponding to each of the sub-bands;

calculating the difference value between the maximum CQI data and the minimum CQI data thereof;

comparing the difference value with the preset initial threshold;

determining the change of the channel to be slow, if the difference value is less than or equal to the initial threshold; and determining the change of the channel to be quick, if the difference value is greater than the initial threshold.

10. The method according to claim 8, wherein directed to each of the sub-bands, adopting the broadband beamforming vector to determine the two polarized-direction beamforming vectors corresponding to the sub-band comprises:

setting the latter I/2 elements in I elements of the broadband beamforming vector as zero and using the obtained beamforming vector as one of the polarized-direction beamforming vectors corresponding to each sub-band wherein I represents the antenna number of the base station; and setting the former I/2 elements in I elements of the broadband beamforming vector as zero and using the obtained beamforming vector as the other beamforming polarized-direction vector corresponding to each sub-band.

11. The method according to claim 8, wherein directed to each of the sub-bands respectively, adopting the sub-band beamforming vector corresponding to the sub-band to determine the two polarized-direction beamforming vectors corresponding to the sub-band comprises:

for the $n^{th}$ sub-band, setting the latter I/2 elements in I elements of the sub-band beamforming vector corresponding to the $n^{th}$ sub-band as zero and using the obtained beamforming vector as one of the polarized-direction beamforming vectors corresponding to the $n^{th}$ sub-band wherein I represents the antenna number of the base station, n=1, 2, . . . , Ng, and Ng represents a total number of the sub-bands; and for the $n^{th}$ sub-band, setting the former I/2 elements in I elements of the sub-band beamforming vector corresponding to the $n^{th}$ sub-band as zero and using the obtained beamforming vector as the other polarized-direction beamforming vector corresponding to the $n^{th}$ sub-band.

12. A device for dual layer beamforming, the device comprising:

one or more processors configured to:

receive, by a dual polarized antenna connected to the processor, a sounding reference signal (SRS) sent by an antenna of a terminal, wherein a broadband occupied when sending SRS is divided into a plurality of sub-bands by the terminal;

determine a broadband beamforming vector corresponding to the broadband and a sub-band beamforming vector corresponding to each sub-band, respectively, according to the SRS;

selectively determine two polarized-direction beamforming vectors corresponding to each sub-band, respectively, according to the broadband beamforming vector corresponding to the broadband or the sub-band beamforming vector corresponding to each sub-band, by determining a channel covariance matrix of the broadband and a channel covariance matrix for each of the sub-bands according to the SRS; and directed to each sub-band, adopt the two polarized-direction beamforming vectors corresponding to the sub-band for dual layer beamforming until all sub-bands are processed.

13. The device according to claim 12, wherein the determining of the broadband beamforming vector corresponding to the broadband and the sub-band beamforming vector corresponding to each sub-band respectively according to the SRS comprises:

determining the channel covariance matrix $\overline{R}$ of the broadband and the channel covariance matrix $\overline{R_n}$ of the $n^{th}$ sub-band according to the SRS wherein n=1, 2 . . . , Ng, and Ng represents a total number of the sub-bands;

determining the initial broadband beamforming vector $w_1$ corresponding to the broadband according to the channel covariance matrix of the broadband and the initial sub-band beamforming vector $w_{n1}$ corresponding to the $n^{th}$ sub-band according to the channel covariance matrix of the $n^{th}$ sub-band; and taking a phase operation for the initial broadband beamforming vector corresponding to the broadband to determine the broadband beamforming vector w corresponding to the broadband and take phase operation for the initial sub-band beamforming vector corresponding to the $n^{th}$ sub-band to determine the sub-band beamforming vector $w_n$ corresponding to the $n^{th}$ sub-band.

14. The device according to claim 13, wherein
when sending the SRS, the terminal occupies K sub-carriers and each sub-band comprises $N_{sc}$ sub-carriers wherein $N_{sc} < K$; and
the determining the channel covariance matrix $\overline{R}$ of the broadband and the channel covariance matrix $\overline{R_n}$ of the $n^{th}$ sub-band according to the SRS comprises:
utilizing the SRS to estimate the frequency domain channel and obtaining the channel estimation matrix of each sub-carrier wherein the channel estimation matrix of the $k^{th}$ sub-carrier is $H_k$: $H_k = [h_k^1 h_k^2 \ldots h_k^I]$
calculating the channel covariance matrix of each sub-carrier wherein the channel covariance matrix of the $k^{th}$ sub-carrier is $R_k$: $R_k = H_k^H H_k$
calculating the channel covariance matrix $\overline{R_n}$ of the $n^{th}$ sub-band according to the channel covariance matrix of the sub-carrier included in the $n^{th}$ sub-band:

$$\overline{R}_n = \frac{1}{N_{sc}^n} \sum_{k=N'+1}^{N'+N_{sc}^n} R_k;$$

and
calculating the channel covariance matrix $\overline{R}$ of the broadband according to the channel covariance matrix of each sub-band:

$$\overline{R} = \frac{1}{Ng} \sum_{n=1}^{Ng} \overline{R}_n,$$

wherein k=1, 2, ..., K; I represents the antenna number of the base station, $N_{sc}^n$ represents the number of sub-carriers included in the $n^{th}$ sub-band, N' represents a total number of sub-carriers included in the former n−1 sub-bands and $H_k^H$ represents a transposed-conjugate matrix of $H_k$.

15. The device according to claim 13, wherein the determining of the initial broadband beamforming vector $w_1$ corresponding to the broadband according to the channel covariance matrix of the broadband comprises:
setting the iterative times M and the initial iterative value $x^1 = A^T$ wherein A is the matrix of row 1 and column I, all elements in A are 1, $A^T$ represents a transposed matrix of A and I represents the antenna number of the base station; and setting the initial value of m as 1;
calculating the intermediate parameter $y^{m+1}$ corresponding to the broadband: $y^{m+1} = \overline{R} * x^m$;
finding the most significant bit for the real part and the imaginary part of each element in the intermediate parameter $y^{m+1}$ corresponding to the broadband and intercepting 15 bits downward from the most significant bit of each element in the intermediate parameter $y^{m+1}$ corresponding to the broadband to obtain $x^{m+1}$;
judging whether m satisfies m≥M;
letting m=m+1 and returning to the step of calculating the intermediate parameter $y^{m+1}$ corresponding to the broadband if it is negative; and
determining the $x^{m+1}$ as the initial broadband beamforming vector $w_1$ corresponding to the broadband if it is positive.

16. The device according to claim 15, wherein the taking of the phase operation for the initial broadband beamforming vector corresponding to the broadband to determine the broadband beamforming vector corresponding to the broadband comprises:
calculating the broadband beamforming vector w corresponding to the broadband according to following formula: $w = x^{m+1}/ \|x^{m+1}\|$; wherein $\|x^{m+1}\|$ represents the absolute value of each element in $x^{m+1}$.

17. The device according to claim 13, wherein the determining of the initial sub-band beamforming vector $w_{n1}$ corresponding to the $n^{th}$ sub-band according to the channel covariance matrix of the $n^{th}$ sub-band comprises:
setting the iterative times M and the initial iterative value $x^1 = A^T$ wherein A is the matrix of row 1 and column I, all elements in A are 1, $A^T$ represents a transposed matrix of A and I represents the antenna number of the base station; and setting the initial value of m as 1;
calculating the intermediate parameter $y_n^{m+1}$ corresponding to the $n^{th}$ sub-band: $y_n^{m+1} = \overline{R_n} * x_n^m$;
finding the most significant bit for the real part and the imaginary part of each element in the intermediate parameter $y_n^{m+1}$ corresponding to the $n^{th}$ sub-band and intercepting 15 bits downward from the most significant bit of each element in the intermediate parameter $y_n^{m+1}$ corresponding to the $n^{th}$ sub-band to obtain $x_n^{m+1}$;
judging whether m satisfies m≥M;
letting m=m+1 and returning to the step of calculating the intermediate parameter $y_n^{m+1}$ corresponding to the $n^{th}$ sub-band if it is negative; and
determining the $x_n^{m+1}$ as the initial sub-band beamforming vector $w_{n1}$ corresponding to the $n^{th}$ sub-band if it is positive.

18. The device according to claim 17, wherein the step of taking the phase operation for the initial sub-band beamforming vector corresponding to the $n^{th}$ sub-band to determine the sub-band beamforming vector $w_n$ corresponding to the $n^{th}$ sub-band comprises:
calculating the sub-band beamforming vector $w_n$ corresponding to the $n^{th}$ sub-band according to following formula: $w_n = x_n^{m+1}/\|x_n^{m+1}\|$, wherein $\|x_n^{m+1}\|$ represents the absolute value of each element in $x_n^{m+1}$.

19. The device according to claim 12, wherein the determining of the two polarized-direction beamforming vectors corresponding to each sub-band respectively according to the broadband beamforming vector corresponding to the broadband or the sub-band beamforming vector corresponding to each sub-band comprises:
detecting a change situation of the channel occupied by the terminal when sending the SRS;
directed to each of the sub-bands, adopting the broadband beamforming vector to determine the two polarized-direction beamforming vectors corresponding to the sub-band, when the detected change situation of the channel is slow; and
directed to each of the sub-bands, adopting the sub-band beamforming vector corresponding to the sub-band to determine the two polarized-direction beamforming vectors corresponding to the sub-band, when the detected change situation of the channel is quick.

20. The device according to claim 19, wherein the detecting of the change situation of the channel occupied by the terminal when sending the SRS comprises:
   acquiring data of a channel quality indicator (CQI) corresponding to each of the sub-bands;
   calculating a difference value between the maximum CQI data and the minimum CQI data thereof;
   comparing the difference value with a preset initial threshold;
   determining the change of the channel to be slow, if the difference value is less than or equal to the initial threshold; and
   determining the change of the channel to be quick, if the difference value is greater than the initial threshold.

21. The device according to claim 19, wherein directed to each of the sub-bands, the adopting of the broadband beamforming vector to determine the two polarized-direction beamforming vectors corresponding to the sub-band comprises:
   setting the latter I/2 elements in I elements of the broadband beamforming vector as zero and using the obtained beamforming vector as one of the polarized-direction beamforming vectors corresponding to each sub-band wherein I represents the antenna number of the base station; and
   setting the former I/2 elements in I elements of the broadband beamforming vector as zero and using the obtained beamforming vector as the other beamforming polarized-direction vector corresponding to each sub-band.

22. The device according to claim 19, wherein directed to each of the sub-bands respectively, the adopting of the sub-band beamforming vector corresponding to the sub-band to determine the two polarized-direction beamforming vectors corresponding to the sub-band comprises:
   for the $n^{th}$ sub-band, setting the latter I/2 elements in I elements of the sub-band beamforming vector corresponding to the $n^{th}$ sub-band as zero and using the obtained beamforming vector as one of the polarized-direction beamforming vectors corresponding to the $n^{th}$ sub-band wherein I represents the antenna number of the base station, n=1, 2, . . . , Ng, and Ng represents a total number of the sub-bands and
   for the $n^{th}$ sub-band, setting the former I/2 elements in I elements of the sub-band beamforming vector corresponding to the $n^{th}$ sub-band as zero and using the obtained beamforming vector as the other polarized-direction beamforming vector corresponding to the $n^{th}$ sub-band.

23. A non-transitory computer readable recording medium recorded with the program for executing the method according to claim 1.

24. The method according to claim 1, wherein the dual polarized antenna includes two mutually orthogonal antennas in polarized directions of +45° and −45°, respectively, and working under a duplex mode of receiving and sending.

25. The method according to claim 1, further comprising: calculating, according to an Eigenvalue Based Beamforming (EBB) calculation method, the broadband beamforming vector corresponding to the broadband and the sub-band beamforming vector corresponding to each sub-band, respectively, according to the SRS.

26. The method according to claim 1, further comprising: adopting a Grid of Beam (GOB) calculation method for two polarized-direction beamforming vectors to calculate the two polarized-direction beamforming vectors corresponding to each sub-band, respectively.

27. The method according to claim 1, further comprising:
   calculating, according to an Eigenvalue Based Beamforming (EBB) calculation method, the broadband beamforming vector corresponding to the broadband and the sub-band beamforming vector corresponding to each sub-band, respectively, according to the SRS; and
   adopting a Grid of Beam (GOB) calculation method for two polarized-direction beamforming vectors to calculate the two polarized-direction beamforming vectors corresponding to each sub-band, respectively.

\* \* \* \* \*